United States Patent
Nagase

(10) Patent No.: US 7,046,293 B1
(45) Date of Patent: May 16, 2006

(54) POWER SUPPLY CIRCUIT AND CCD CAMERA USING SAME

(75) Inventor: Kenji Nagase, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/082,581

(22) Filed: May 21, 1998

(30) Foreign Application Priority Data

May 22, 1997 (JP) ................................. 9-131786
May 22, 1997 (JP) ................................. 9-131787

(51) Int. Cl.
*H04N 5/225* (2006.01)
(52) U.S. Cl. ..................................................... 348/372
(58) Field of Classification Search ............... 348/294, 348/311, 372; 363/20, 21.01, 21.12, 21.16, 363/63, 95, 89, 21.13, 21.14, 21.15, 21.17, 363/21.18; 320/166; 323/247, 259
See application file for complete search history.

(56) References Cited

U.S. PATENT DOCUMENTS

| | | | |
|---|---|---|---|
| 3,818,306 A | | 6/1974 | Marini ........................... 321/2 |
| 4,118,739 A | * | 10/1978 | Umehara .................. 363/21.18 |
| 4,608,625 A | * | 8/1986 | Josephson et al. ........ 363/21.17 |
| 4,802,739 A | * | 2/1989 | Iwamoto ...................... 363/60 |
| 5,225,958 A | * | 7/1993 | Nakamura .................... 348/76 |
| 5,301,095 A | * | 4/1994 | Teramoto et al. ............. 363/89 |
| 5,465,202 A | * | 11/1995 | Ibori et al. ..................... 363/34 |
| 5,475,500 A | * | 12/1995 | Takeda ....................... 358/401 |
| 5,523,665 A | * | 6/1996 | Deaver ........................ 320/166 |
| 5,530,636 A | * | 6/1996 | Brown ..................... 363/21.12 |
| 5,703,765 A | * | 12/1997 | Preis ........................ 363/21.15 |
| 5,896,284 A | * | 4/1999 | Murasato et al. ........... 323/267 |

FOREIGN PATENT DOCUMENTS

| | | |
|---|---|---|
| EP | 0 503 715 | 9/1992 |
| EP | 0 503 715 A1 | 9/1992 |
| EP | 0 676 854 | 10/1995 |
| EP | 0 676 854 A2 | 10/1995 |
| GB | 2 293 663 | 4/1996 |
| JP | 01-148061 | 6/1989 |
| JP | 01-303048 | 12/1989 |
| JP | 02-273031 | 11/1990 |
| JP | 02-294224 | 12/1990 |
| JP | 06-165483 | 6/1994 |
| JP | 407336610 A * | 12/1995 |

(Continued)

OTHER PUBLICATIONS

Patent Abstracts of Japan, 05064432, Mar. 12, 1993.

(Continued)

*Primary Examiner*—Tuan Ho
*Assistant Examiner*—Jason Whipkey
(74) *Attorney, Agent, or Firm*—Westerman, Hattori, Daniels & Adrian, LLP

(57) ABSTRACT

A power circuit includes a switching controller. The switching controller outputs a switching signal to a base of a transistor, according to a PWM method. The output of the transistor is supplied to a primary winding of the transformer. A first circuit and a second circuit are formed on a secondary winding side of the transformer. The first and second circuits generate, respectively, a voltage, e.g. of 15V, and a voltage, e.g., of −7.5V. 15V is outputted through a first terminal, while −7.5V is through a second terminal. The respective voltages are supplied to a CCD imager and a timing generator of a camera. A short circuit, including an FET and a resistance connected in series to the FET, is connected between the first terminal and the second terminal.

8 Claims, 4 Drawing Sheets

FOREIGN PATENT DOCUMENTS

WO 96/28878 9/1996

OTHER PUBLICATIONS

Patent Abstracts of Japan vol. 18, No. 382 (E-1580), Jul. 19, 1994 & JP 06 111978 A (Matsushita Electric Works), Apr. 22, 1994 *abstract*.

Patent Abstracts of Japan vol. 1995, No. 5, Jun. 30, 1995 & JP 07 044134 A (NEC. Corp.), Feb. 14, 1995 *abstract*.

Patent Abstracts of Japan vol. 7, No. 247 (E-208), Nov. 2, 1983 & JP 58 136137 A (Hitachi Seisakusho), Aug. 13, 1983 *abstract*.

Patent Abstracts of Japan vol. 10, No. 197 (E-418), Jul. 10, 1986 & JP 61 040075 A (NEC Corp.), Feb. 26, 1986 *abstract*.

Patent Abstracts of Japan vol. 15, No. 63 (P-1166), Feb. 14, 1991 & JP 02 287807 A (Mitsubishi Electric Corp.), Nov. 27, 1990 *abstract*.

Patent Abstracts of Japan vol. 0, No. 0, Jul. 19, 1993 & JP 05 064432 A (Tokyo Electric), Mar. 12, 1993 *abstract*.

* cited by examiner

POWER SUPPLY CIRCUIT AND CCD CAMERA USING SAME

BACKGROUND OF THE INVENTION

1. Field of the Invention

This invention relates to a power supply circuit and a CCD camera using the same, and more particularly to a power supply circuit for supplying a positive polarity power voltage and a negative polarity power voltage, particularly, to a camera using a CCD imager or a display unit using an LCD panel, for example.

2. Description of the Prior Art

The motion-picture and/or still-picture cameras using, for example, a CCD imager usually require four power voltages of 3.3V, 5V, 15V and −7.5V, and accordingly use a positive/negative-voltage power supply circuit.

In the positive/negative-voltage power supply circuits, there is a necessity that each terminal of the CCD imager be satisfied by an absolute maximum rating of CCD when turning on or off a power switch of the camera. In particular, there may be a case that the above requirement cannot be satisfied due to a long discharge period of time (voltage attenuation time period) for a comparatively high voltage, such as 15V and −7.5V, upon turning off the power switch.

Meanwhile, the discharge time period during turning off the power is determined by a capacitance of a smoothing capacitor and an input impedance on a load (CCD imager) side. Therefore, the discharge time can be optimally set by adjusting a discharging resistance and a capacitance of a smoothing capacitor connected in parallel with the load. That is, the discharge time can be shortened by decreasing the capacitance of the smoothing capacitor and/or reducing the discharge resistance.

However, there is a limitation in decreasing the capacitance of the smoothing capacitor because there arises inconvenience in securing a performance, such as increase of noises, of a power supply circuit. On the other hand, the reduction in discharge resistance results in increase in steadily-consumable current (load current), giving rise to another problem such as lower in efficiency for the power supply circuit.

SUMMARY OF THE INVENTION

Therefore, it is a primary object of this invention to provide a power supply circuit which is capable of shortening the discharge period of time without the necessity of decreasing smoothing-capacitor capacitance or discharge resistance.

It is another object of this invention to provide a power supply circuit which can improve a starting characteristic of a fly-back circuit.

A power supply circuit according to this invention, comprises: a first circuit for generating a positive polarity voltage; a first terminal for outputting the positive polarity voltage from the first circuit; a second circuit for generating a negative polarity voltage; a second terminal for outputting the negative polarity voltage from the second circuit; and a short circuit for short-circuiting substantially between the first terminal and the second terminal in response to a power-off signal.

For example, when the power switch of a camera is turned off, a micro-computer of the camera outputs a power-off signal. In response to this power-off signal, a PWM switching controller, for example, is disabled. At the same time, the first terminal and second terminal are short-circuited substantially therebetween through a short-circuit.

Where the short circuit includes a series circuit of a switching element and a current-limiting element, the switching element is turned on by a power-off signal. Accordingly, a current flows through the current-limiting element due to the residual charges on the respective smoothing capacitors connected to the first and second terminals. The current is dissipated as thermal energy by the current-limiting element. Therefore, the residual electric charges are promptly discharged to thereby shorten the discharge time for the positive-polarity voltage and the negative-polarity voltage.

Even where the short-circuit does not contain a current-limiting element, the above-stated current due to the residual charges is dissipated by an internal resistance (on resistance) of the switching element. Therefore, the residual charges are promptly discharged in a similar manner, shortening the discharge time for the positive-polarity voltage and the negative-polarity voltage.

The power supply circuit is employed in a CCD camera so that respective positive polarity voltage and negative polarity voltage are supplied to a CCD imager thereof. According to this invention, the discharge time during current-off can be shortened by merely connecting a short-circuit between the first terminal and the second terminal, without the necessity of reducing smoothing capacitor capacitance or discharge resistance.

According to one aspect of this invention, the first circuit includes a chopper circuit for generating a low first positive voltage, and a fly-back circuit for receiving the first positive voltage from the chopper circuit to generate a high second positive voltage, wherein the power supply circuit further comprises: first and second output terminals for respectively outputting the first positive voltage and the second positive voltage; and a diode connected between the first and second output terminals in a forward direction of from the first positive voltage output terminal to the second positive voltage output terminal.

In the above-stated power supply circuit, however, the second circuit for generating the negative polarity voltage may be omitted. In such a case, a power supply circuit, comprising: a chopper circuit for generating a low first voltage; a fly-back circuit for receiving the first voltage from the chopper circuit to generate a high second voltage; first and second terminals for respectively outputting the first and second voltages; and a diode connected between the first terminal and the second terminal in a forward direction of from the first terminal to the second terminal.

In this aspect, when a power switch of the camera for example is turned on, a power-on signal is outputted from a micro-computer of the camera. A PWM-switching controller, for example, is enabled in response to this power-on signal. The chopper circuit accordingly generates a first voltage. This first voltage is outputted to the first terminal, which in turns outputted from the first terminal to the second terminal through the diode. Accordingly, when the chopper circuit is started, the second terminal immediately has a voltage outputted thereto. Then, if fly-back circuit is started and the second voltage exceeds over the first voltage, a reverse bias is applied to the diode and turns off the same diode.

In this manner, a first voltage from the chopper circuit is outputted at the first terminal, and simultaneous therewith a voltage output is given at the second terminal. Therefore, the starting characteristic is improved, and the absolute maximum rating of the CCD imager can be satisfied.

The power supply circuit is employed in a CCD camera so that respective positive polarity voltage and negative polarity voltage are supplied to a CCD imager thereof.

The above described objects and other objects, features, aspects and advantages of the present invention will become more apparent from the following detailed description of the present invention when taken in conjunction with the accompanying drawings

DETAILED DESCRIPTION OF PREFERRED EMBODIMENTS

Figure 1:
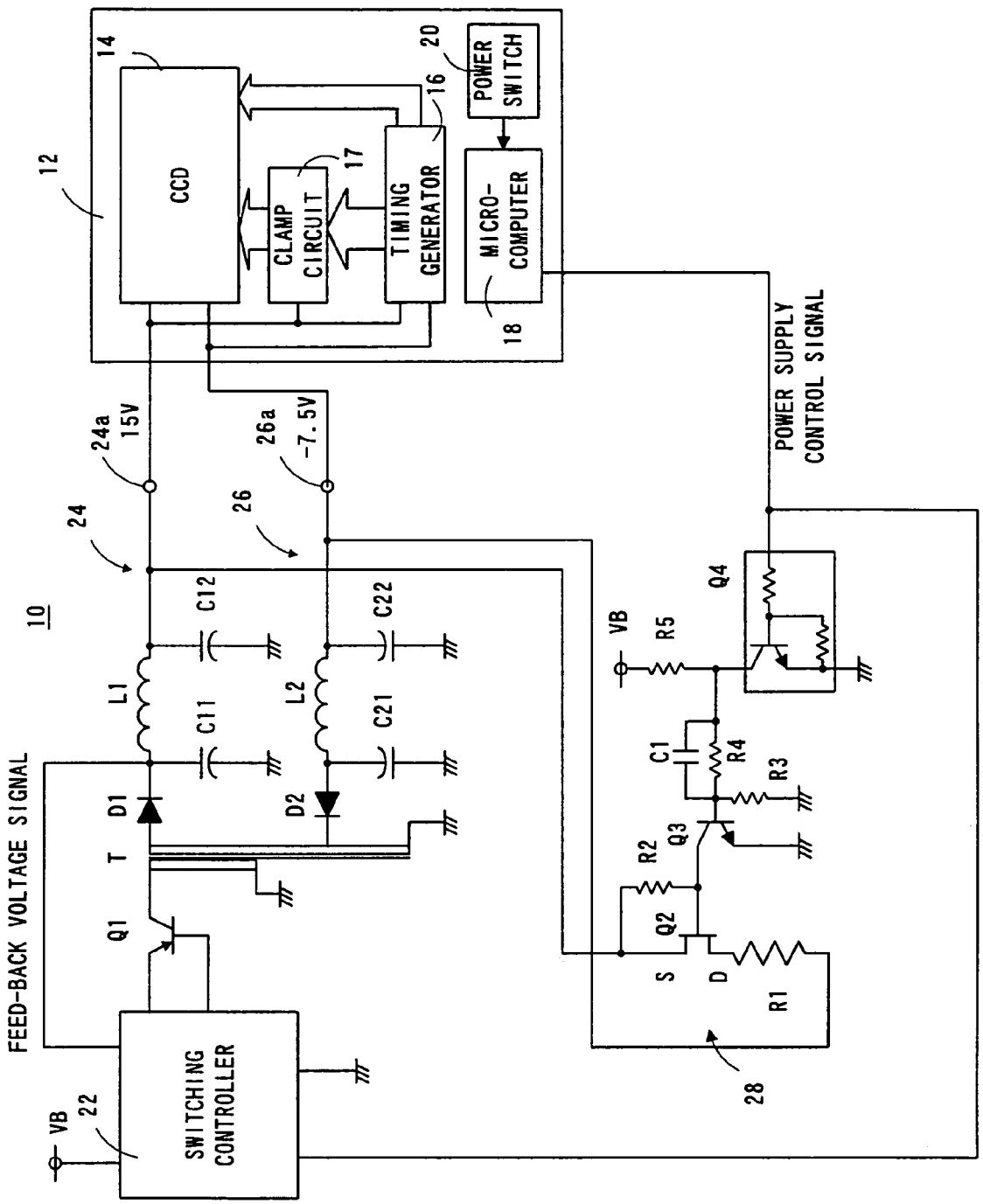
FIG. 1 is a circuit diagram showing one embodiment of this invention.

Referring to FIG. 1, a positive/negative-voltage power supply circuit 10, in this embodiment, is utilized as a power supply circuit of a camera 12. It should be noted beforehand that the positive/negative-voltage power supply circuit of this invention can be also utilized as a power supply for a display unit using an LCD panel etc., besides for a camera.

The camera 12 includes a CCD imager 14 and a timing generator 16 for supplying various drive voltages to the CCD imager 14. These CCD imager 14 and the timing generator 16, in this embodiment, are supplied with two power voltages of 15V and −7.5V from the power supply circuit 10. The camera 12 further includes a micro-computer 18 to control the overall operation of the camera 12. This micro-computer 18 receives an operational signal from the power switch 20. The micro-computer 18 operates on a power voltage of, for example, 5V or 3.3V. When the power switch 20 is turned on, the micro-computer 18 outputs a power-on signal. If the power switch 20 is turned off, the micro-computer 18 outputs a power-off signal. The power-on signal and the power-off signal are illustrated as power-supply control signals in FIG. 1.

The power supply circuit 10 includes a switching controller 22. This switching controller 22 is supplied with the above-stated power supply control signal. Accordingly, the switching controller 22 is enabled by the power-on signal, and disabled by the power-off signal. The switching controller 22 receives a power voltage VB from, for example, a battery (not shown). The switching controller 22, when enabled, outputs a switching signal according, for example, to a PWM method to a base of a pnp transistor Q1. The emitter-collector of the transistor Q1 is connected between a power voltage from a battery and one terminal of a primary winding of a transformer T. The other terminal of the primary winding of the transformer T is grounded.

Two circuits 24 and 26 are formed on a side of a secondary winding of the transformer T. The circuit 24 functions as a first circuit to generate a positive-polarity voltage, e.g. 15V. The circuit 26 serves as a second circuit to create a negative polarity voltage, e.g. −7.5V. The voltage 15V generated by the first circuit 24 is outputted through a first terminal 24a to the CCD imager 14 of the camera 12 and the timing generator 16 for supplying various drive voltages to the CCD imager 14. The camera 12 further includes a clamp circuit 17. The voltage −7.5V generated by the second circuit 26 is outputted through a second terminal 26a to the CCD imager 14 and the timing generator 16.

The first circuit 24 is so-called a fly-back circuit, and includes a rectifying diode D1 connected to the first terminal of the secondary winding of the transformer T, a smoothing capacitor C11 for receiving a direct-current voltage from the diode D1, and a filter formed by a choke coil L1 and capacitor C12 connected to the smoothing capacitor C11. The second circuit 26 is also a fly-back circuit, and includes a rectifying diode D2 being connected to a second terminal of the secondary winding of the transformer T, a smoothing capacitor C21, and a filter formed by a choke coil L2 and a capacitor C22.

In this embodiment, between the first terminal 24a and the second terminal 26a is connected a short-circuit 28 which includes an FET Q2 functioning as a switching element and a resistance R1 connected in series to the FET Q2. That is, the FET Q2 has a source connected to the first terminal 24a, and a drain connected to one end of the resistance R1. The other end of the resistance R1 is connected to the second terminal 26a. A pull-up resistance R2 is connected between the source and the gate of the FET Q2.

The gate of the FETQ2 forming the short-circuit 28 is connected to a collector of an npn transistor Q3. The transistor Q3 has an emitter grounded, and a base connected with biasing resistances R3 and R4. The resistance R4 is connected with a speed-up capacitor C1 in parallel therewith. The base of the transistor Q3, therefore, is connected to a collector of an npn transistor Q4 through a parallel circuit of the resistance R4 and the capacitor C1. The collector of the transistor Q4 is connected to a power voltage VB of a battery (not shown) through a collector resistance R5. The transistor Q4 at a base receives the above-stated power supply control signal outputted from the micro-computer 18 of the camera 12.

In response to turning-on of the power supply switch 20, the micro-computer 18 outputs a power-on signal, e.g. 5V. In response thereto, the switching controller 22 is enabled to output 15V to the first terminal 24a and −7.5V to the second terminal 26a, according to a well-known PWM method. On the other hand, since the power-on signal is applied to the base of the transistor Q4, this transistor Q4 is turned on. The transistor Q3 at its base becomes 0V. The transistor Q3 is turned off. At this time, the gate of the FETQ2 is pulled-up to 15V by a resistance R2, and accordingly the FET Q2 is off. Accordingly, the short-circuit 28 is not in operation, and the first circuit 24 and the second circuit 26 continue their normal operations.

In response to turning-off of the power supply switch 20, the micro-computer 18 outputs a power-off signal, e.g. 0V. In response thereto, the switching controller 22 is disabled to stop the operation of the first circuit 24 and the second circuit 26. Accordingly, both the voltage 15V at the first terminal 24a and the voltage −7.5V at the second terminal 26a are shut off. However, electric charges are built up on the smoothing capacitors C11 and C21 and the filter capacitor C12 and C22, and the voltages 15V and −7.5V will not immediately drops to 0V.

On the other hand, the power-off signal is applied to the base of the transistor Q4, and turning off the transistor Q4. Accordingly, the transistor Q3 is applied at the base by a biasing voltage determined by the voltage VB and the resistances R5, R4 and R3. Therefore, the transistor Q3 is turned on so that the FET Q2 has a gate voltage of 0V. Thus the FET Q2 is turned on. This causes the short-circuit 28 to operate so that the first terminal 24a and the second terminal 26a are short-circuited therebetween through the resistance R1. Accordingly, the positive electric charges stored on the smoothing capacitor C11 and the filter capacitor C12 and the negative electric charges on the smoothing capacitor C21 and the filter capacitor C22 causes a current flowing through the resistance R1. At this time, the amount of the current is restricted by the resistance R1 so as not to cause an excessively high rush current flowing through the FET Q2. That is, the resistance R1 serves as a current-limiting resistance.

If a current flows through the current-limiting resistance R1 due to operation of the short-circuit 28, the current-limiting resistance R1 is heated up by this current. In other words, the residual charges on the capacitors C11, C12, C21 and C22 are dissipated as thermal energy by the resistance R1. Therefore, the residual charges decreases to 0 in a short time.

Figure 2:
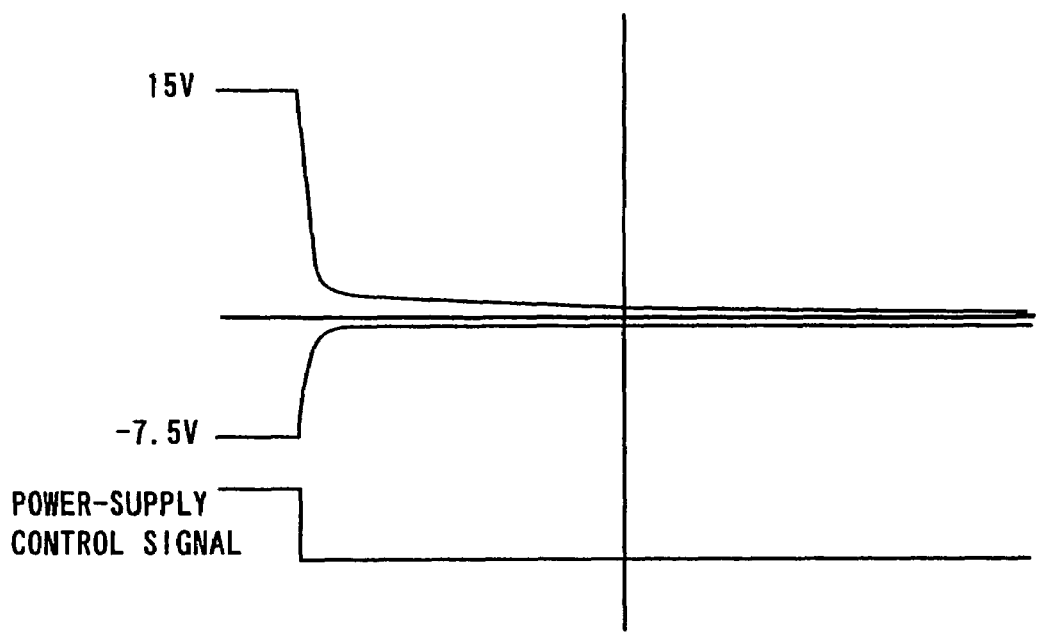
FIG. 2 is a graph showing a discharge time in the FIG. 1 embodiment, wherein the horizontal axis denotes time while the vertical axis voltage.
Figure 3:
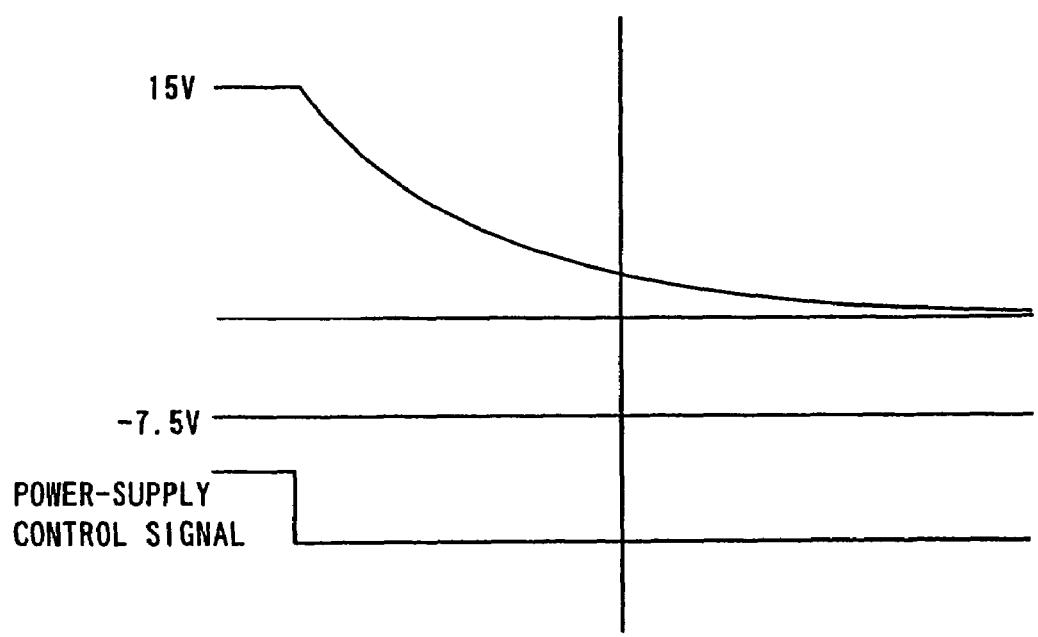
FIG. 3 is a graph showing discharge time in a prior art lacking a short-circuit of the FIG. 1 embodiment, wherein the horizontal axis denotes time while the vertical axis voltage.

In the FIG. 1 embodiment, the discharge time of period for the voltage 15V, −7.5V is shortened to, for example, around 7.5 milli-seconds in this manner as shown in FIG. 2. Incidentally, in the prior art lacking a short-circuit 28 and its peripheral circuits with respect to the FIG. 1 embodiment, the discharge time for 15V is approximately 200 milli-seconds, and the discharge time for −7.5V is about 20 seconds that is further longer. It is therefore understood from the FIG. 1 embodiment that the discharge time can be greatly shortened without changing the smoothing capacitor or discharge resistance (not shown).

Where the first circuit 24 and the second circuit 26 respectively of 15V and −7.5V are independently provided in the FIG. 1 embodiment, it is possible to separately adjust the discharge time so as to satisfy the rating stated before. However, even if the first circuit 24 and the second circuit 26 are provided with individual transformers, it is impossible to solve the problem that the discharge time for −7.5V is excessively long similarly to the prior art so long as the switching controller 22 is commonly provided thereto.

Incidentally, it is needless to say that the polarity of the FET Q2 in the short-circuit 28 or other transistors Q3–Q4, etc. or the polarity of the power supply control signal can arbitrary selectively set.

The short-circuit 28 may be formed only by switching elements such as FETs. In such a case, since there is no current-limiting resistance, the residual charges are discharged (consumed as thermal energy) through the on-resistance of the switching element.

Also, where no current-limiting resistance is provided in the short-circuit 28, it is expected that the rush current due to the residual charges increases. In such a case, a greater current rating of a switch element is preferably employed.

The switching element may use a bipolar transistor, GTO, etc., besides the FET as in the embodiment.

A motion and/or still picture camera using, for example, a CCD imager, as in the FIG. 1 embodiment, usually requires a lower power voltage, such as 3.3V or 5V, and a higher power voltage, such as 15V. In the power supply circuit for a CCD camera, therefore, a lower voltage circuit is usually realized by means of a chopper method while a higher voltage circuit by a fly-back method using a transformer.

Accordingly, the power supply, at a start, is in such an output characteristic that is prolonged in start-up time for the higher voltage circuit, as compared to that of the lower voltage circuit. There may be a case that an absolute maximum rating is not satisfied for the CCD imager.

There is a limitation of transformer characteristic to shorten a start-up time for the higher voltage circuit. Due to this, it could be considered that the start-up time of the lower voltage circuit be increased to harmonize with the start-up time for the higher voltage circuit. However, where the high voltage circuit is formed in such a configuration as to receive an output from the lower voltage circuit so as to generate a higher voltage, if the start-up time be increased for the lower voltage circuit, the start-up time for the higher voltage circuit is also increased together therewith. That is, it is impossible to improve the above-stated starting characteristic by merely setting soft start.

Figure 4:
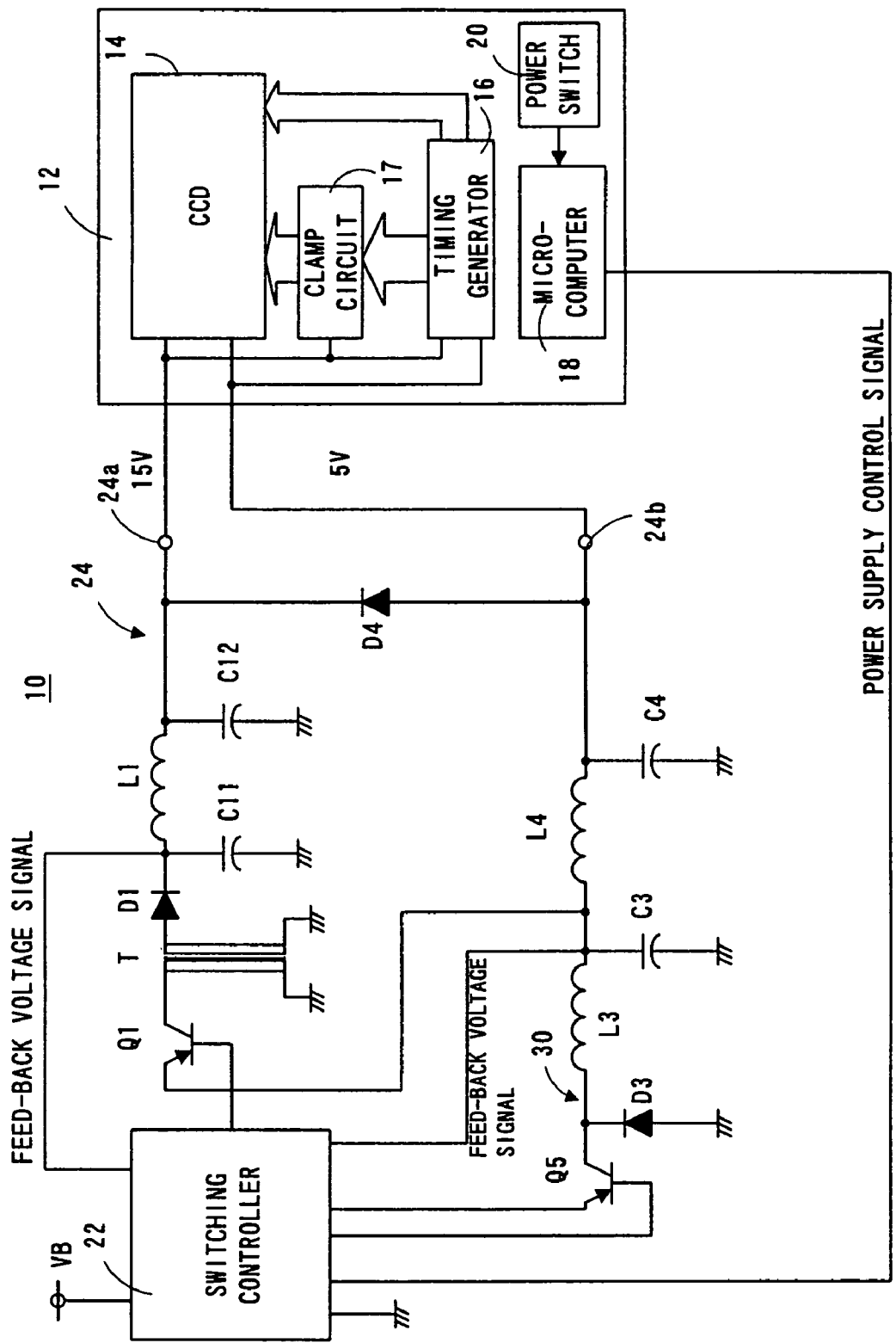
FIG. 4 is a circuit diagram showing another embodiment of this invention.

In order to solve such a problem, a FIG. 4 embodiment is illustrated. The FIG. 4 embodiment is a modification to the FIG. 1 embodiment, wherein the second circuit 26 of the FIG. 1 embodiment, i.e. a portion related to the negative-polarity voltage, is omitted.

Referring to FIG. 4, a power supply circuit 10, in this embodiment, is utilized as a power supply circuit of a camera 12. This camera 12 includes a CCD imager 14, a timing generator 16 for supplying various drive voltages to the CCD imager 14, and a clamping circuit 17. The CCD imager 14 and the timing generator 16, in this embodiment are each supplied with two power voltages of 15V and 5V from the power supply circuit 10. The clamping circuit 17 is supplied with 15V. The camera 12 further includes a micro-computer 18 to control the overall operation of the camera 12. This micro-computer 18 receives operational signals from the power switch 20. The micro-computer 18 operates on a power voltage of, e.g. 3.3V, not shown. When the power switch 20 is turned on, a power-on signal is outputted from the micro-computer 18, while if the power switch 20 is turned off, a power-off signal is outputted from the micro-computer 18. The power-on signal and the power-off signal are illustrated as power supply control signals in FIG. 4.

The power supply circuit 10 includes a switching controller 22 so that this switching controller 22 is supplied with the above-stated power supply control signals. Accordingly, the switching controller 22 is enabled by the power-on signal, and disabled by the power-off signal. The switching controller 22 receives a power supply voltage VB, for example, from a battery (not shown) so that it outputs a switching signal to a base of a pnp transistor Q5 according to, for example, a PWM method. The transistor Q5, constituting a chopper circuit 30, has an emitter to receive the battery power voltage VB and a collector connecting with a fly-wheel diode D3. The chopper circuit 30 further includes a chopper coil L3 to receive a collector voltage of the transistor Q5, a smoothing capacitor C3, and a choke coil LA and a capacitor C4 both connected to the smoothing capacitor C3. The chopper circuit 30 is a circuit to generate a lower power voltage, e.g. 5V. The lower power voltage generated by this chopper circuit 30 is outputted through the first terminal 24b, and supplied to the CCD imager 14 and the timing generator 16 of the CCD camera 12.

On the other hand, the output of the smoothing capacitor C3 of the chopper circuit 30 is supplied as an input voltage to the fly-back circuit 24 for generating a high power voltage. The fly-back circuit 24 includes a pnp transistor Q1, and an emitter of which receives a direct current supplied from the smoothing capacitor C3. A collector of the transistor Q1 is connected to one terminal of a primary winding of a transformer T. The primary winding of the transformer T has another terminal being grounded.

The fly-back circuit 24 includes a rectifying diode D1 connected to one terminal of a secondary winding of the transformer T, a smoothing capacitor C11 for receiving a d.c. voltage from the diode D1, and a filter formed by a choke coil L1 connected to the smoothing capacitor C11 and a capacitor C12. The fly-back circuit 24 generates a higher power voltage, e.g. 15V, so that this 15V is outputted through the second terminal 24a to the CCD imager 14 of the CCD camera 12, the timing generator 16 and the clamping circuit 17 of the CCD camera 12.

In this embodiment, a diode D4 is connected between the first terminal 24b and the second terminal 24a in a forward direction of from the first terminal 24b to the second terminal 24a.

Figure 5:
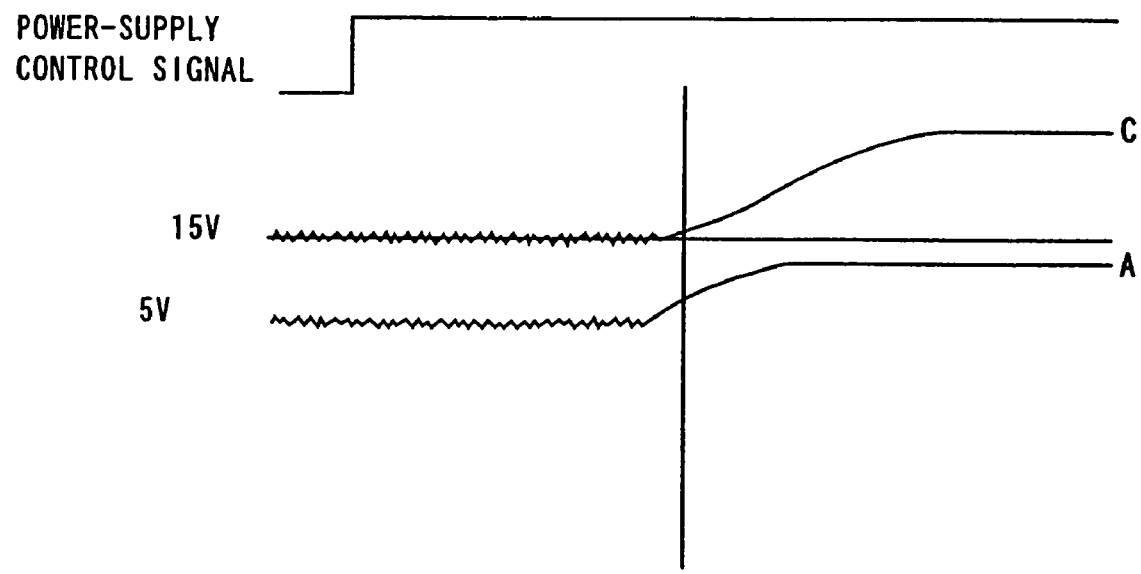
FIG. 5 is a graph showing a starting characteristic in the FIG. 4 embodiment, wherein time is represented by a horizontal axis and voltage by a vertical axis.
Figure 6:
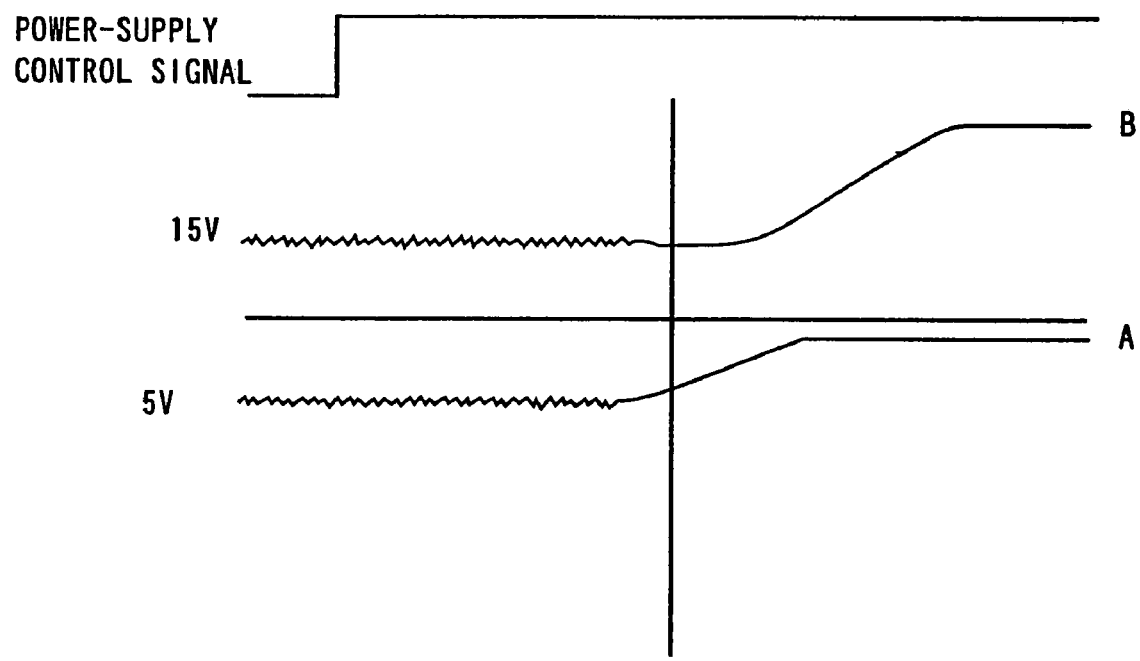
FIG. 6 is a graph showing a starting characteristic of a prior art lacking a diode of the FIG. 4 embodiment, wherein time is represented by a horizontal axis and voltage by a vertical axis.

Responsive to turning-on of the power supply switch 20, the micro-computer 18 outputs a power-on signal, e.g. 5V. In response thereto, the switching controller 22 is enabled to start the chopper circuit 30 according to a well-known PWN method. Consequently, the first terminal 24b of the chopper circuit 30 has a power voltage according to starting characteristic of the chopper circuit 30, as shown by a line A in FIG. 5. On the other hand, the fly-back circuit 24 has a long start-up time so that the second terminal 24a at this time has no power voltage output as shown by a line B in FIG. 6. However, in the FIG. 4 embodiment the first terminal 24b and the second terminal 24a has the diode D4 connected therebetween so that the voltage generated by the chopper circuit 30 is also supplied to the second terminal 24a through the diode D4. Accordingly, the second terminal 24a has an output voltage outputted simultaneously with the start of the chopper circuit 30, as shown by a line C in FIG. 5. That is, if there is a difference between the timing of output of a power voltage through the first terminal 24b and the timing of output of a power voltage through the second terminal 24a as shown by the line B in FIG. 6, it is impossible to fulfill the absolute maximum rating required by the CCD imager 14. However, if there is an approach between the timing of output through the first terminal 24b and the timing of output through the second terminal as in this embodiment, the above-stated absolute maximum rating can be satisfied.

Thereafter, when the fly-back circuit 24 is started and the voltage generated by the fly-back circuit 24 exceeds the voltage (5V) at the first terminal 24b, the diode D4 is reverse biased. Accordingly, no electric current flows from the second terminal 24a to the first terminal 24b. Therefore, both the two circuits 30 and 24 continue their normal operations.

Incidentally, in the FIG. 4 embodiment, the first terminal 24b and the second terminal 24a were connected through the diode. However, this diode may be substituted by a transistor. However, where a transistor is used, an especial circuit is required to control the turning-on/off of the transistor. Therefore, it is preferred to use the diode for simplification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply circuit, comprising:
   a control circuit;
   a first circuit for generating a positive polarity voltage, said first circuit including a rectifying circuit and a capacitor;
   a positive polarity voltage outputting terminal for outputting the positive polarity voltage from said first circuit;
   a second circuit for generating a negative polarity voltage;
   a negative polarity voltage outputting terminal for outputting the negative polarity voltage from said second circuit;
   a ground terminal for providing a reference potential for both of said positive polarity voltage and said negative polarity voltage; and
   a short circuit for short-circuiting substantially between said positive polarity voltage outputting terminal and said negative polarity voltage outputting terminal in response to a power-off signal provided by the control circuit;
   wherein the power-off signal stops operation of the first circuit and the second circuit and discharges residual charges of the capacitor by said short circuit; and
   wherein said first circuit includes a chopper circuit for generating a low first positive voltage.

2. A power supply circuit according to claim 1, wherein said short-circuit includes a series circuit having a switching element and a current-limiting element connected between said positive polarity voltage outputting terminal and said negative polarity voltage outputting terminal.

3. A power supply circuit according to claim 1, wherein said short circuit includes a switching element connected between said positive polarity voltage outputting terminal and said negative polarity voltage outputting terminal.

4. A power supply circuit according to claim 1, wherein said first circuit includes a chopper circuit for generating a low first positive voltage, and a fly-back circuit for receiving the first positive voltage from the chopper circuit to generate a high second positive voltage,
   said positive polarity voltage outputting terminal includes first and second output terminals for respectively outputting the first positive voltage and the second positive voltage, and further comprising:
   a diode connected between said first and second output terminals in a forward direction from said first output terminal to said second output terminal, the first output terminal of said positive polarity voltage outputting terminal receiving the first positive voltage from the chopper circuit and not from the fly-back circuit.

5. A power supply circuit, comprising:
   a chopper circuit for generating a low first voltage;
   a fly-back circuit for receiving the first voltage from said chopper circuit to generate a high second voltage;
   first and second terminals for respectively outputting the first and second voltages as power outputs of the power supply circuit, the first terminal receiving the first voltage from said chopper circuit and not from said fly-back circuit; and
   a diode connected between said first terminal and said second terminal in a forward direction from said first terminal to said second terminal.

6. A camera, comprising:
   a micro-computer;
   a first circuit for generating a positive polarity voltage;
   a first terminal for outputting the positive polarity voltage from said first circuit;
   a second circuit for generating a negative polarity voltage;
   a second terminal for outputting the negative polarity voltage from said second circuit;
   a short circuit for short-circuiting substantially between said first terminal and said second terminal in response to a power-off signal from said micro-computer; and
   a CCD imager for receiving the positive polarity voltage and negative polarity voltage through said first terminal and said second terminal.

7. A camera, comprising:
   a chopper circuit for generating a low first voltage;
   a fly-back circuit for receiving the first voltage from said chopper circuit to generate a high second voltage;
   first and second terminals for respectively outputting the first voltage as a positive polarity voltage and the second voltage as a negative polarity voltage, the first terminal receiving the first voltage from said chopper circuit and not from said fly-back circuit;

a diode connected between said first terminal and said second terminal in a forward direction from said first terminal to said second terminal; and a CCD imager for receiving the positive polarity voltage and negative polarity voltage through said first terminal and said second terminal.

8. A power supply circuit, comprising:

a first circuit for generating a positive polarity voltage;

a first terminal for outputting the positive polarity voltage from said first circuit;

a second circuit for generating a negative polarity voltage;

a second terminal for outputting the negative polarity voltage from said second circuit; and a short circuit for short-circuiting substantially between said first terminal and said second terminal in response to a power-off signal;

wherein said first circuit includes a chopper circuit for generating a low first positive voltage, and a fly-back circuit for receiving the first positive voltage from the chopper circuit to generate a high second positive voltage, and further comprising:

first and second output terminals for respectively outputting the first positive voltage and the second positive voltage as outputs of the power supply circuit, the first output terminal receiving the first positive voltage from the chopper circuit and not from the fly-back circuit; and a diode connected between said first and second output terminals in a forward direction of from said first positive voltage output terminal to said second positive voltage output terminal.

* * * * *